(12) United States Patent
Chen et al.

(10) Patent No.: US 6,321,174 B1
(45) Date of Patent: Nov. 20, 2001

(54) APPARATUS AND METHOD FOR TESTING ADD-ON DEVICE OF A COMPUTER SYSTEM

(75) Inventors: Jao-Ching Chen; Shu-Yi Yen; Peter Chang, all of Hsinchu (TW)

(73) Assignee: Winbond Electronics Corp. (TW)

( * ) Notice: Subject to any disclaimer, the term of this patent is extended or adjusted under 35 U.S.C. 154(b) by 0 days.

(21) Appl. No.: 09/247,747

(22) Filed: Feb. 9, 1999

(51) Int. Cl.[7] .................................................. G05B 24/04
(52) U.S. Cl. ........................ 702/122; 702/108; 702/188; 702/62; 710/129
(58) Field of Search ............................. 702/122; 710/129

(56) References Cited

U.S. PATENT DOCUMENTS

| | | | |
|---|---|---|---|
| 5,455,957 | * 10/1995 | Pawlowski et al. ................ | 395/800 |
| 5,659,690 | * 8/1997 | Stuber et al. ....................... | 395/309 |
| 5,748,922 | * 5/1998 | Smith et al. ........................ | 395/309 |
| 5,857,083 | * 1/1999 | Venkat ................................ | 395/309 |
| 5,864,688 | * 1/1999 | Santos et al. ....................... | 395/309 |
| 5,909,560 | * 6/1999 | Kenny et al. ....................... | 395/309 |
| 5,953,511 | * 9/1999 | Sescila et al. ...................... | 395/309 |
| 6,098,141 | * 8/2000 | Williams et al. ................... | 710/129 |
| 6,105,146 | * 8/2000 | Tavallaei et al. .................. | 714/2 |
| 6,112,273 | * 8/2000 | Kau et al. ........................... | 710/260 |
| 6,157,976 | * 12/2000 | Tien et al. .......................... | 710/129 |
| 6,182,182 | * 1/2001 | Bradley et al. .................... | 710/129 |

* cited by examiner

*Primary Examiner*—Marc S. Hoff
*Assistant Examiner*—Carol S Tsai
(74) *Attorney, Agent, or Firm*—Coudert Brothers

(57) ABSTRACT

An apparatus is provided to test a device, i.e. an interface card to a computer system or an IC chip. The apparatus communicates with the computer system via a first bus and communicates with the device via a second bus. The first and second buses are standard bus such as ISA bus, EISA bus, PCI bus, and AGP bus, etc. In the apparatus, three switch circuits respectively making connection of data/address lines, power lines and a reset line of the first bus to the second bus are provided. A test program executed in the computer generates a plurality of control signal to the apparatus. A control circuit, responsive to the plurality of control signals, controls individually and selectively the turn-on of three switch circuits. By test program running in the computer system, the function test of the device can be accomplished automatically without time-consuming power-off and re-initialization of the computer system.

18 Claims, 4 Drawing Sheets

APPARATUS AND METHOD FOR TESTING ADD-ON DEVICE OF A COMPUTER SYSTEM

FIELD OF INVENTION

The present invention relates to an apparatus and method for testing a device, i.e. an add-on device of a computer system or an integrated circuit chip.

BACKGROUND OF INVENTION

After being manufactured, the functions of device, for instance, an add-on device of a computer system or an IC chip, is usually tested by a predetermined manner. The add-on device include the well known interface card.

A conventional approach to test an interface card is to install the interface card into a dedicated interface slot and to test whether the interface card operates as designed. However, to remove an interface card from the slot or insert an interface card into the slot of computer system, the operator must turn off the power to the computer system and the interface card first. After each interface card to be tested is inserted into the interface slot, the operator re-powers on the computer system. Afterwards, the computer system spends some times to do initialization. When a large amount of devices are required to test, it is evident that time-consuming power-on and initialization procedures of the computer system are involved in this conventional approach.

A test apparatus, illustrated in FIG. 1, was developed by Leap Corporation which allows the replacement of an interface card under continuous power-on condition of the computer system. The test apparatus 12 is attached to a first slot 11 on the computer system 10. The test apparatus 12 includes a slot 17 for insertion of the interface card 18 to be tested and the slot 17 transmits the data/address lines 131, the power lines 141, and the reset line 151 of the second bus 171. The test apparatus 12 further includes switch circuits 13, 14, and 15 each of which are respectively electrically connected to the slot 17 by the data/address lines 131, the power lines 141, and the reset line 151. The switch circuits 13, 14, and 15 are respectively electrically connected to the first slot 11 by the data/address lines 112, the power lines 113, and the reset line 114 of the first bus 111. As the switch circuit 13 is turned on by the control signal 191 from the switch button 161, the data/address lines 112 on the first bus 111 make connection to the data/address lines 131 on the second bus 171. As the switch circuit 14 is turned on by the control signal 192 from the switch button 162, the power supplies on power lines 113 are applied to the power lines 141 of the second bus 171. As the switch circuit 15 is turned on by the control signal 193 from the switch button 163, the reset signal on the reset line 114 is transmitted to the reset line 151 of the second bus. On the contrary, as the switch circuit 13 is turned off, the data/address lines 112 on the first bus 111 are isolated from the data/address lines 131 on the second bus 171. As the switch circuit 14 is turned off, the power lines 141 of the second bus 171 are cut off from the power supplies. As the switch circuit 15 is turned off, the reset signal does not appear on the reset line 151 of the second bus. In general, the first bus 111 and the second bus 171 are standard bus, such as ISA, EISA, PCI, and AGP, respectively.

The test can be accomplished with the assistance of three manually operated switch buttons 161, 162, 163. During initial power-on, all switch buttons 161, 162, 163 are activated. When replacement of the interface card 18 under the test environment shown in FIG. 1 is required, three manually operated switch buttons 161, 162, 163 are utilized to individually control the connection of the data/address signals, the power supplies and the reset signal. Therefore, in most conditions, the test apparatus provided by LEAP Corporation performs the function test efficiently. However, when the bus 111, 171 involved are the PCI or AGP bus, the test apparatus 12 shown in FIG. 1 is still inconvenient due to following reason. Different from an add-on device employing the EISA or ISA bus, an add-on device employing a PCI bus or AGP bus must be configured by the BIOS of the computer system 10 rather than the physical setup. Therefore, each time to test a PCI-type or AGP-type add-on device under the test environment shown in FIG. 1, the computer system 10 needs to reset and to re-configure the PCI-type or AGP-type add-on device. Besides, it is evident that the test procedures involved in the test apparatus 12 of FIG. 1 cannot be automated due to the manually operated switch buttons 161, 162, 163 in the test apparatus 12.

Accordingly, it is main objective of the invention to provide an apparatus and method for testing an add-on device or integrated circuit chip in an efficient way. The concept of this present invention is equally applicable to the test of an add-on device employing EISA, ISA, PCI, or AGP bus, etc.

SUMMARY OF INVENTION

The invention provides an apparatus for testing function of a device. The device includes the add-on device of a computer system, i.e. an interface card, and the IC chip. The apparatus communicates with the computer system via a first bus and communicates with the device via a second bus. The first and second buses are standard bus, e.g. EISA, ISA, PCI and AGP bus, etc.

According to the invention, the transmission of data/address signals, power signals and reset signal between the computer system and the device are enabled selectively and individually. Thereby, the test of the device can be accomplished without the time-consuming power on/off operation and re-initialization of the computer system. By a test program running in the computer system, the test of the device can also be accomplished automatically.

The first bus includes a multiple of data/address lines, power lines, and a reset line. The computer system includes an output port and a control program is executed in the computer system generating a plurality of control signals to the output port. The test apparatus includes a connection device, a first switch, a second switch, a third switch, a register and a control device.

The connection device makes connection of the second bus to the test apparatus. The first switch makes connection of the data/address lines of the first bus to the second bus while the first switch is switched on. The second switch makes connection of the power lines of the first bus to the second bus while the second switch is switched on. The third switch makes connection of the reset line of the first bus to the second bus while the third switch is switched on. The register is electrically connected to the output port for storing and outputting the plurality of control signals. The control circuit, responsive to the plurality of control signals, individually and selectively switches on the first, second and third switch.

According to the invention, an apparatus is provided for testing a device. The apparatus communicates with a computer system via a first bus which comprises a multiple of data/address lines, power lines, and a reset line. The apparatus communicates with the device via a second bus. The computer system comprises an output port, and a control program is executed in the computer system for generating a plurality of control signals to the output port. The apparatus comprises a connection device, a first switch circuit, a second switch circuit, a third switch circuit, a register, and a control circuit. The connection device functions to make connection of the second bus to the apparatus. The first switch circuit makes connection of the data/address lines of the first bus to the second bus while the first switch circuit is switched on. The second switch circuit makes connection of the power lines of the first bus to the second bus while the second switch circuit is switched on. The third switch circuit makes connection of the reset line of the first bus to the second bus while the third switch circuit is switched on. The register is electrically connected to the output port for storing and outputting the plurality of control signals. The control circuit, responsive to the plurality of control signals, functions to individually and selectively switch on the first, second and third switch circuits. Consequently, various testing conditions of the device, such as replacement, initialization, and function test, can be automatically accomplished by means of the control program executed in the computer system and the data/address lines, power lines, and reset line of the first bus, according to the control signals, capable of connecting to the second bus individually and selectively without the time-consuming power on/off operation and re-initialization of the computer system.

BRIEF DESCRIPTION OF THE APPENDED DRAWINGS

Figure 1:
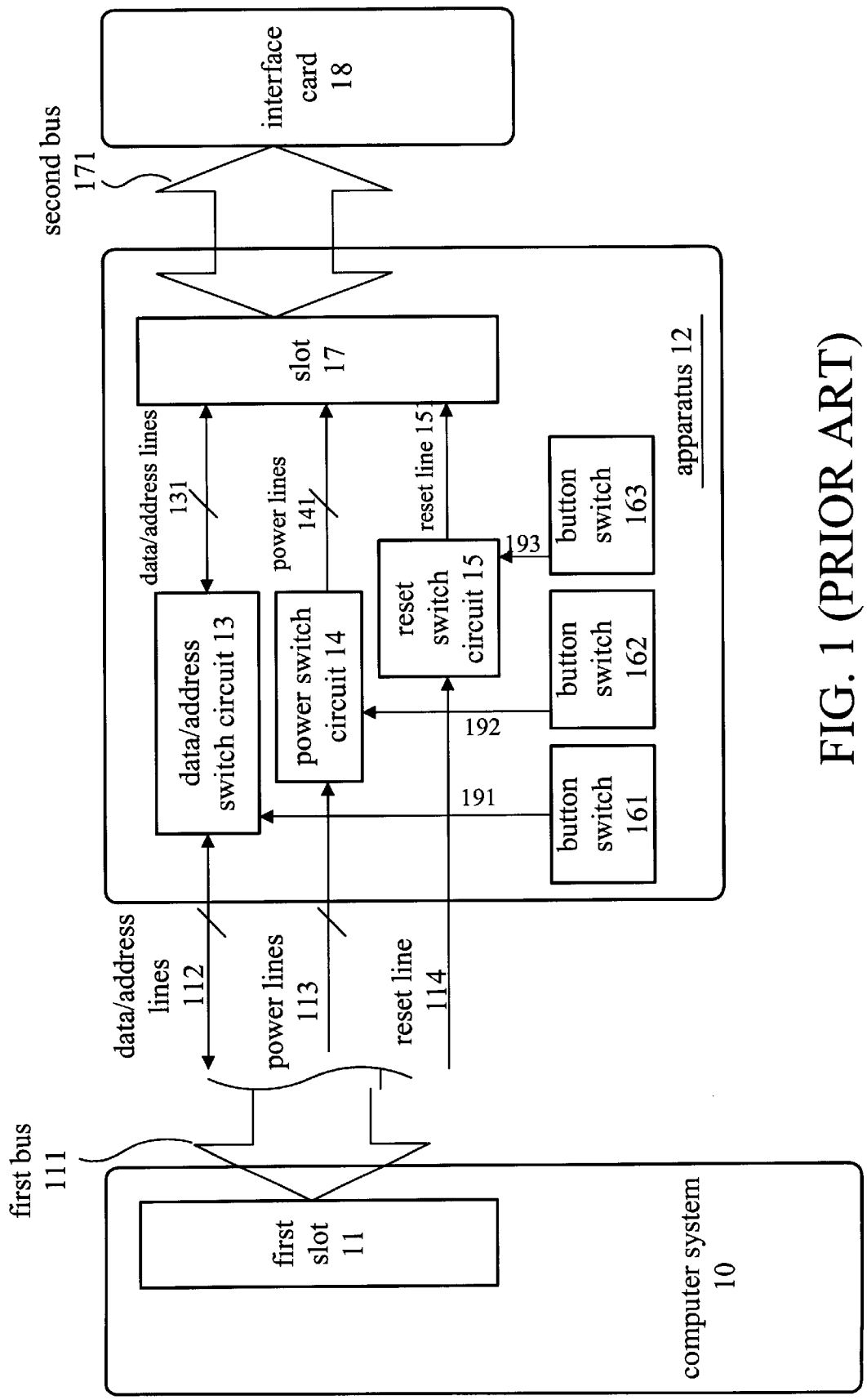
FIG. 1 illustrates the configuration of one prior art test apparatus.
Figure 2:
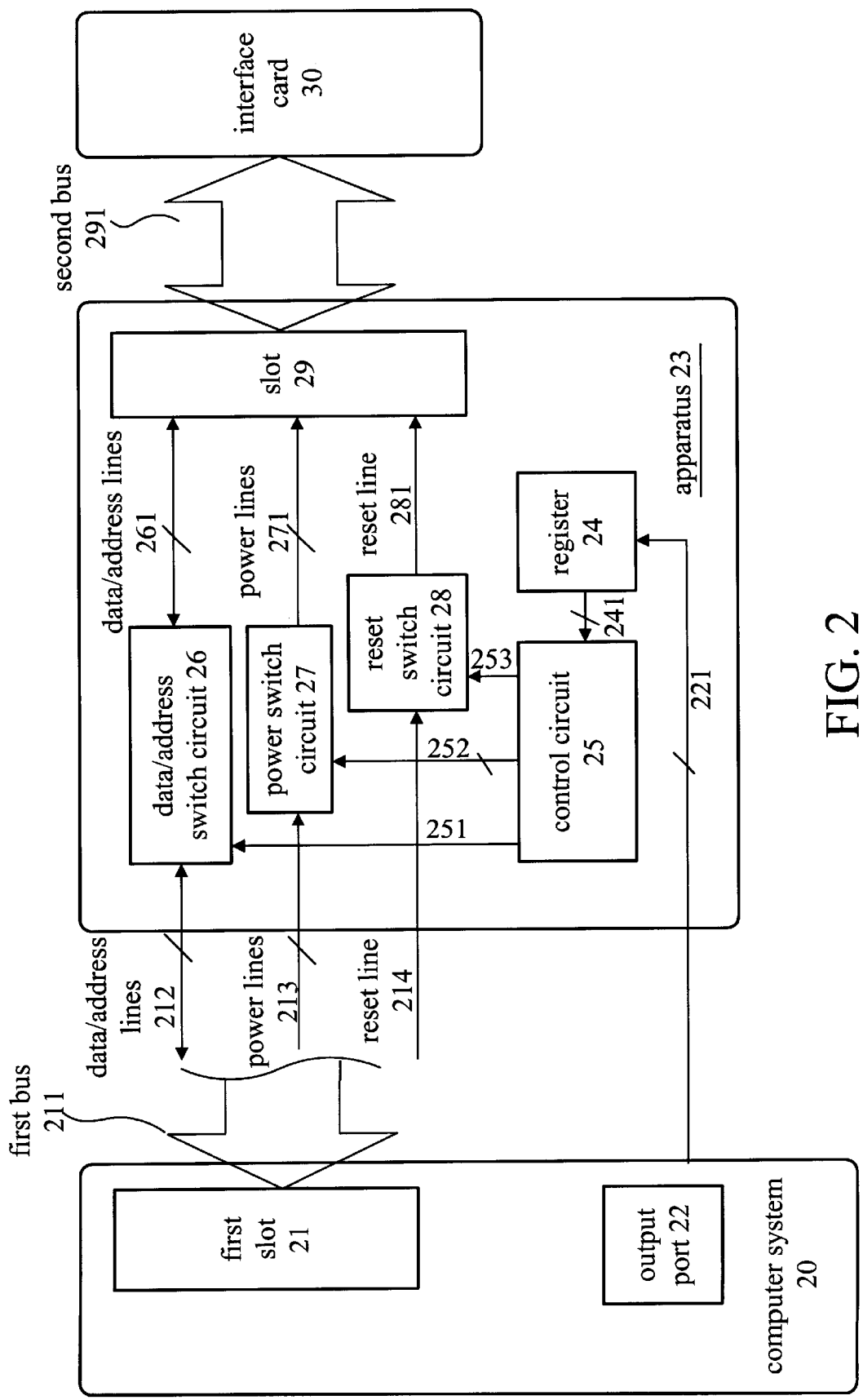
FIG. 2 shows the embodiment of the invention testing an interface card.
Figure 3:
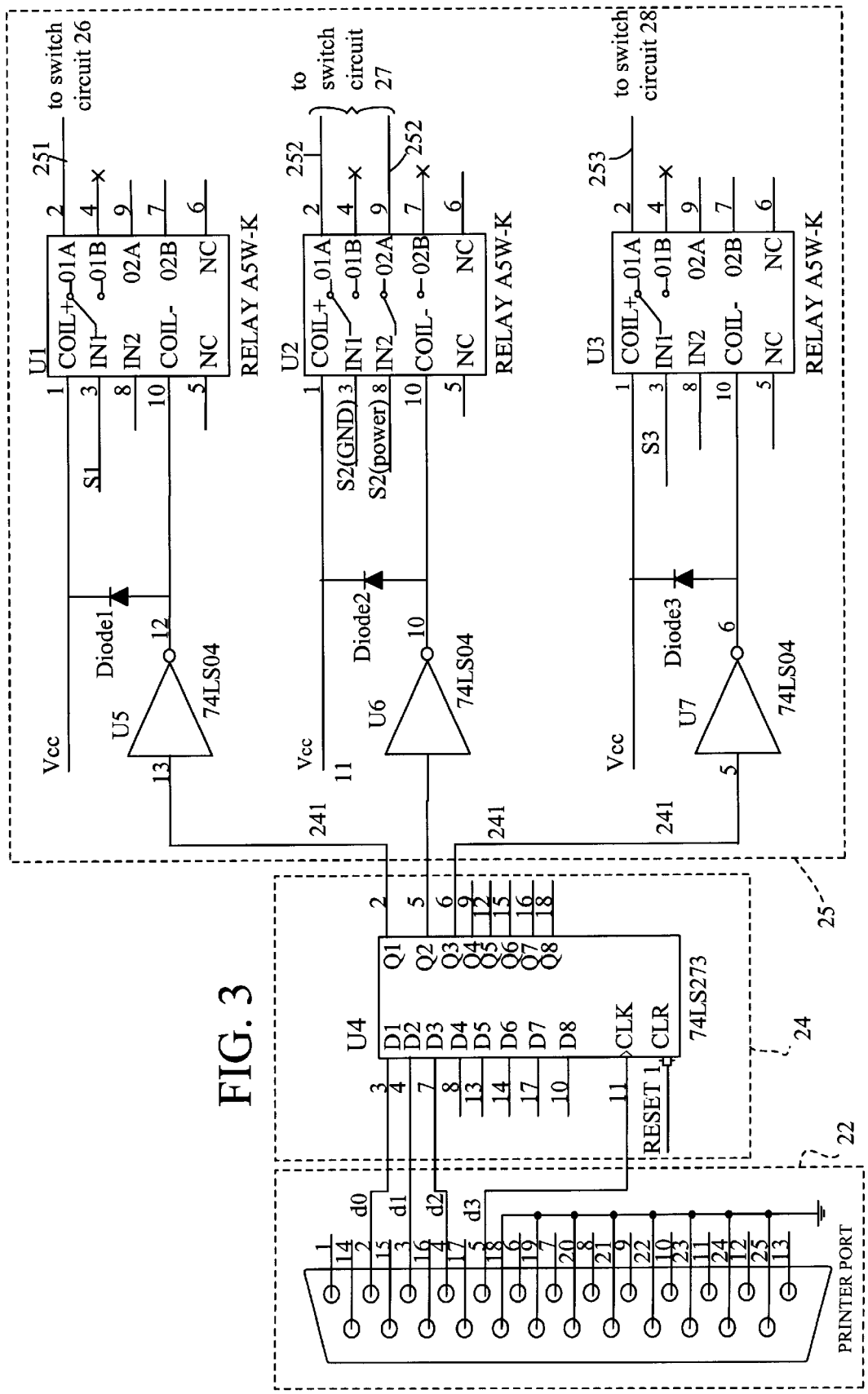

FIG. 3 is a circuit diagram schematically showing the details of output port 22, register 24, and control circuit 25 in the test apparatus of FIG. 2.

Figure 4:
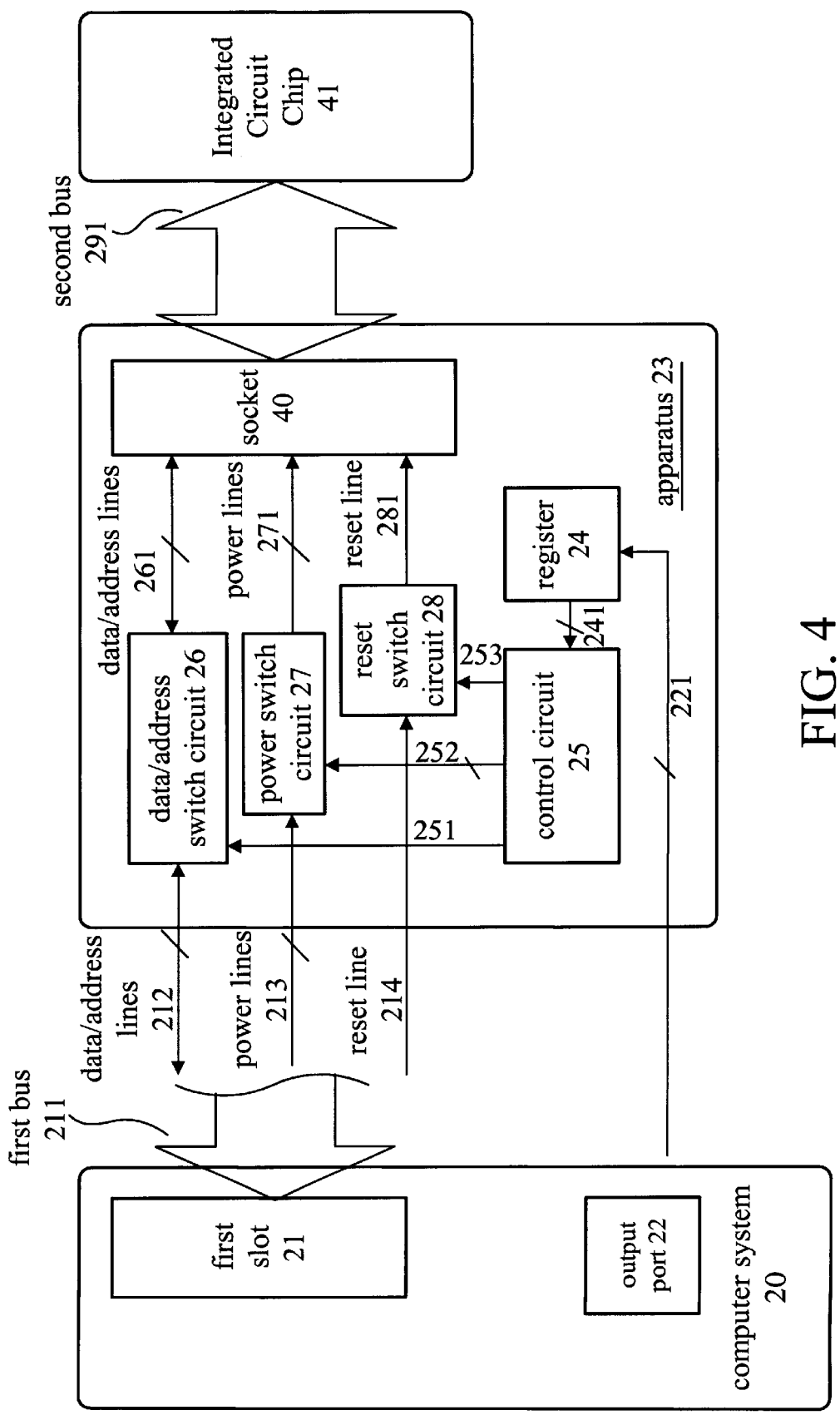

FIG. 4 shows how the invention tests an IC chip.

DETAILED DESCRIPTION OF THE INVENTION

Referring to FIG. 2, the embodiment of the invention is illustrated. As shown in FIG. 2, the test apparatus 23 provided by the invention includes a register 24, the switch circuits 26, 27, 28, a control circuit 25 and a slot 29 for inserting the interface card 30 to be tested. The test apparatus 23 is attached to a first slot 21 of the computer system 20 via the first bus 211 on one hand. On the other hand, the test apparatus 23 is attached to the interface card 30 via the second bus 291. The slot 29, which transmits the data/address lines 261, the power lines 271, and the reset line 281 of the second bus 291, receives the interface card 30 to be tested. The switch circuits 26, 27, and 28 each respectively are electrically connected to the slot 29 by the data/address lines 261, the power lines 271, and the reset line 281. The switch circuits 26, 27, and 28 respectively are electrically connected to the first slot 21 by the data/address lines 212, the power lines 213, and the reset line 214 of the first bus 211. As the switch circuit 26 is turned on by a first control signal 251 from the control circuit 25, the data/address lines 212 on the first bus 211 make connection to the data/address lines 261 on the second bus 291. As the switch circuit 27 is turned on by a second control signal 252 from the control circuit 25, the power supplies on power lines 213 are applied to the power lines 271 of the second bus 291. As the switch circuit 28 is turned on by a third control signal 253 from the control circuit 25, the reset signal on the reset line 214 is transmitted to the reset line 281 of the second bus 291. On the contrary, as the switch circuit 26 is turned off, the data/address lines 212 on the first bus 211 are isolated from the data/address lines 261 on the second bus 291. As the switch circuit 27 is turned off, the power lines 271 of the second bus 291 are cut off from the power supplies. As the switch circuit 28 is turned off, the reset signal does not appear on the reset line 281 of the second bus 291. In general, the first bus 211 and the second bus 291 are standard bus, such as ISA, EISA, PCI, and AGP respectively. The signal lines 221 are used to transmit the data from the output port 22 of computer system 20 to the register 24. The data stored within the register 24 are transmitted, via signal lines 241, to the control circuit 25 to selectively activate the first, second and third control signals (251, 252 and 253) respectively. During the test, a test program (not shown) executing within the computer system 20 outputs three control data to the registers 24 through the output port 22.

When the interface card 30 tested employing a PCI-type or AGP-type bus, the computer system 20 configures the interface card 30 via the BIOS within the computer system 20. Each time a new device 30 is inserted, re-initialization of the new device 30 is performed, without resetting the computer system 20, by the test program executing in the computer system 20.

With the embodiment of FIG. 2, the method, provided by the invention, of removing power supplies from the device (interface card 30) includes the following steps.

1. Reading a configuration data of the device through the data/address lines 261 of the second bus 291 and the data/address lines 212 of the first bus 211.

2. Saving the configuration data of the device into the computer system 20.

3. De-activating the first control signal 251 for isolating the data/address lines 212 of the first bus 211 from the second bus 291.

4. De-activating the second control signal 252 to switch off the second switch 27 such that the power supplies of the first bus 211 are not applied to the second bus 291.

With the embodiment of FIG. 2, the method, provided by the invention, of replacing a first device (first interface card 30) by a second device (second interface card 30) includes the following steps.

1. Removing power supplies from the first device already connected to the test apparatus 23.

2. Removing the first device from the test apparatus 23.

3. Inserting the second device into the test apparatus 23.

4. Adding power supplies to the second device.

5. Initializing the second device.

From the above recitation, it is evident that the invention results in convenience during the test of interface card or integrated circuit chip. Especially, since no reset operation of computer system and re-initialization operation are involved, this invention provides significant enhancement of efficiency.

The invention may be understood by referring to a further details shown in FIG. 3. In FIG. 3, we use the standard printer port as an example of the output port 22 in FIG. 2. However, it is noted that other ports, i.e. COM 1 or COM2 of the computer system 20, may alternatively be used. The well known latch device 74LS273 is selected as the register 24 in FIG. 2. The control circuit 25 mainly includes three sets of relay device U1, U2, U3. The operation details of control circuit 25 will be reiterated hereinafter.

The d0, d1, d2, d3 signals from the pins p2, p3, p4, p5 of the printer port 22 are respectively input to the input terminals D1, D2, D3, CLK of the latch 24. And the corresponding latch outputs 241 are generated at the output terminals Q1, Q2, Q3 respectively. The d3 signal is a positive edge trigger clock which latches the d0, d1, d2 signals into the output terminals Q1, Q2, Q3 of the latch 24 respectively. The Reset signal from the computer system 20 is used to clear the latch device 24. The signal 241 to the inverter U5 controls the operation of relay U1. The signal 241 to the inverter U6 controls the operation of relay U2. The signal 241 to the inverter U7 controls the operation of relay U3.

As d0=1 is latched, the output Q1 of the latch 24 is logic 1. The U5 outputs logic 0. At this time, a current flows from pin 1 to pin 10 of U1 which activates action of U1. In other words, the S1 signal is outputted to the pin 2. Under this condition of control signal 251, the switch circuit 26 is turned on to make connection of the data/address lines. As d0=0 is latched, the output Q1 of the latch 24 is logic 0. The U5 outputs logic 1. At this time, no current flows from pin 1 to pin 10 of U1 which de-activates action of U1. In other words, the S1 signal is outputted to the pin 4. Under this condition of control signal 251, the switch circuit 26 is turned off to isolate the data/address lines. A diode disposed between the terminals of pin 1 and pin 10 of U1 is used to prevent the bouncing phenomenon during on-off action of the relay which may instabilize the relay. The S1 signal is the signal which turns on the switch circuit 26 and the S1 signal may be generated individually within a circuit (not shown) of the test apparatus 23.

As d1=1 is latched, the output Q2 of the latch 24 is logic 1. The U6 outputs logic 0. At this time, a current flows from pin 1 to pin 10 of U2 which activates action of U2. In other words, the S2(GND), S2(power) signals are respectively outputted to the pins 2, 9. Under this condition of control signals 252, the power switch circuit 27 is turned on to transmit the power supplies. As d1=0 is latched, the output Q2 of the latch 24 is logic 0. The U6 outputs logic 1. At this time, no current flows from pin 1 to pin 10 of U2 which de-activates action of U2. In other words, the S2(GND), S2(power) signals are respectively outputted to the pins 4, 7. Under this condition of control signals 252, the power switch circuit 27 is turned off to disconnect the power supplies from the power lines 271. A diode disposed between the terminals of pin 1 and pin 10 of U2 is used to prevent the bouncing phenomenon during on-off action of the relay which may instabilize the relay. The S2(GND) signal is the signal which makes the GND power supply applying to the power lines 271 and the S2(GND) signal may be generated individually within a circuit (not shown) of the test apparatus 23. The S2(power) signal is the signal which makes the a power supply, i.e. +5V, applying to the power lines 271 and the S2(power) signal may be generated individually within a circuit (not shown) of the test apparatus 23.

As d2=1 is latched, the output Q3 of the latch 24 is logic 1. The U7 outputs logic 0. At this time, a current flows from pin 1 to pin 10 of U3 which activates action of U3. In other words, the S3 signal is outputted to the pin 4. Under this condition of control signal 253, the switch circuit 28 is turned on to make connection of the reset line. As d2=0 is latched, the output Q3 of the latch 24 is logic 0. The U7 outputs logic 1. At this time, no current flows from pin 1 to pin 10 of U3 which de-activates action of U3. In other words, the S3 signal is outputted to the pin 2. Under this condition of control signal 253, the switch circuit 28 is turned off to isolate the reset line. A diode disposed between the terminals of pin 1 and pin 10 of U3 is used to prevent the bouncing phenomenon during on-off action of the relay which may instabilize the relay. The S3 signal is the signal which turns on the switch circuit 28 and the S3 signal may be generated individually within a circuit (not shown) of the test apparatus 23.

Referring to FIG. 4, the invention is also applicable to test an IC chip 41 when a corresponding socket 40 for the IC chip is provided. In FIG. 4, the element having same numeral notations at that in FIG. 2 performs the same function as recited with regard to FIG. 2. The socket 40 is a socket for insertion of a corresponding IC chip 41.

What is claimed is:

1. An apparatus for selectively isolating a device from a computer system which is always powered-on, said apparatus communicating with the computer system via a first bus, the computer system being external to and separate from the apparatus, the computer system having a slot for connecting with said first bus, the first bus comprising a multiple of data/address lines, power lines, and a reset line, and said apparatus communicating with said device via a second bus, the computer system comprising an output port, and a control program being executed in said computer system to generate a plurality of control signals to said output port, said apparatus comprising:

a connection device for making connection of the second bus to said apparatus;

a first switch circuit for making connection of the data/address lines of the first bus to the second bus while the first switch circuit being switched on;

a second switch circuit for making connection of the power lines of the first bus to the second bus while the second switch circuit being switched on;

a third switch circuit for making connection of the reset line of the first bus to the second bus while the third switch circuit being switched on; and a register electrically connected to said output port for storing and outputting the plurality of control signals;

a control circuit, responsive to the plurality of control signals, for individually and selectively switching on said first, second and third switch circuits.

2. The apparatus of claim 1, wherein said control circuit comprises:

a first relay, responsive to a first control signal of the plurality control signals, for transmitting a first switch-on signal to switch on the first switch circuit;

a second relay, responsive to a second control signal of the plurality control signals, for transmitting a second switch-on signal to switch on the second switch circuit;

a third relay, responsive to a third control signal of the plurality control signals, for transmitting a third switch-on signal to switch on the third switch circuit.

3. The apparatus of claim 1, wherein said register is a latch.

4. The apparatus of claim 1, the device being an interface card and wherein said connection device is a slot for insertion of the interface card.

5. The apparatus of claim 1, the device being an IC chip and wherein said connection device is a socket for insertion of the IC chip.

6. A method for selectively isolating a device from a computer system which connects to a control apparatus, the control apparatus communicating with the computer system via a first bus, the computer system being external to and separate from the apparatus, the computer system being always powered-on and having a slot for connecting with said first bus, the first bus comprising a multiple of data/address lines, power lines, and a reset line, and the control apparatus communicating with said device via a second bus, the computer system comprising an output port, a control program being executed in said computer system generating a plurality of control signals to said output port, said control apparatus comprising a connection device for making connection of the second bus to said control apparatus; a first switch circuit for making connection of the data/address lines of the first bus to the second bus while the first switch circuit being switched on; a second switch circuit for making connection of the power lines of the first bus to the second bus while the second switch circuit being switched on; a third switch circuit for making connection of the reset line of the first bus to the second bus while the third switch circuit being switched on; a register electrically connected to said output port for storing and outputting the plurality of control signals; and a control circuit, responsive to the plurality of control signals, for individually and selectively switching on said first, second and third switch circuit, the method comprising the following steps:

accepting a first user command removing the power supplies from the device;

reading a configuration data of the device from the data/address lines of the second bus;

saving the configuration data of the device into the computer system;

de-activating a first control signal of the plurality control signals for isolating the data/address lines of the first bus from the second bus;

de-activating a second control signal of the plurality control signals to switch off the second switch circuit such that the power supplies of the first bus are not applied to the second bus.

7. The method of claim 6, further comprising the following steps:

accepting a second user command adding power to the device;

activating the second control signal of the plurality control signals to switch on the second switch circuit such that the power supplies of the first bus are applied to the second bus;

activating a third control signal of the plurality control signals to switch on the third switch circuit such that the device is reset;

activating the first control signal of the plurality control signals for connecting the data/address lines of the first bus to the second bus;

initializing the device by writing the configuration data into the device.

8. The method of claim 7, wherein said control circuit comprises:

a first relay, responsive to the first control signal of the plurality control signals, for transmitting a first switch-on signal to switch on the first switch circuit;

a second relay, responsive to the second control signal of the plurality control signals, for transmitting a second switch-on signal to switch on the second switch circuit;

a third relay, responsive to the third control signal of the plurality control signals, for transmitting a third switch-on signal to switch on the third switch circuit.

9. The method of claim 6, wherein said register is a latch.

10. The method of claim 6, the device being an interface card and wherein said connection device is a slot for insertion of the interface card.

11. The method of claim 6, the device being an IC chip and wherein said connection device is a socket for insertion of the IC chip.

12. A method for replacing a first device being tested by a computer system connecting to a control apparatus with a second device to be tested, the control apparatus communicating with the computer system via a first bus, the computer system being external to and separate from the control apparatus, the computer system being always powered-on and having a slot for connecting with said first bus, the first bus comprising a multiple of data/address lines, power lines, and a reset line, and the control apparatus communicating with said first device via a second bus, the computer system comprising an output port, a control program being executed in said computer system generating a plurality of control signals to said output port, said control apparatus comprising a connection device for making connection of the second bus to said control apparatus; a first switch circuit for making connection of the data/address lines of the first bus to the second bus while the first switch circuit being switched on; a second switch circuit for making connection of the power lines of the first bus to the second bus while the second switch circuit being switched on; a third switch circuit for making connection of the reset line of the first bus to the second bus while the third switch circuit being switched on; a register electrically connected to said output port for storing and outputting the plurality of control signals; and a control circuit, responsive to the plurality of control signals, for individually and selectively switching on said first, second and third switch circuits, the method comprising the steps of:

removing power supplies from the first device connected to the control apparatus;

removing the first device from the control apparatus;

inserting the second device into the control apparatus;

adding power supplies to the second device;

initializing the second device.

13. The method of claim 12, wherein the step of removing power supplies comprises of the steps of:

reading a configuration data of the first device from the data/address lines of the second bus;

saving the configuration data of the first device into the computer system;

de-activating a first control signal of the plurality of control signals for isolating the data/address lines of the first bus from the second bus;

de-activating a second control signal of the plurality of control signals to switch off the second switch circuit such that the power supplies of the first bus are not applied to the second bus.

14. The method of claim 12, wherein the step of adding power supplies comprises of the steps of:

activating the second control signal of the plurality of control signals to switch on the second switch circuit such that the power supplies of the first bus are applied to the second bus;

activating a third control signal of the plurality of control signals to switch on a third switch circuit such that the second device is reset;

activating the first control signal of the plurality of control signals for connecting the data/address lines of the first bus to the second bus.

15. The method of claim 14, wherein said control circuit comprises:

a first relay, responsive to the first control signal of the plurality control signals, for transmitting a first switch-on signal to switch on the first switch circuit;

a second relay, responsive to the second control signal of the plurality control signals, for transmitting a second switch-on signal to switch on the second switch circuit;

a third relay, responsive to the third control signal of the plurality control signals, for transmitting a third switch-on signal to switch on the third switch circuit.

16. The method of claim 12, wherein said register is a latch.

17. The method of claim 12, the first device and the second device are interface card respectively and wherein said connection device is a slot for insertion of the interface card.

18. The method of claim 12, the first and the second device are IC chip respectively and wherein said connection device is a socket for insertion of the IC chip.

* * * * *